US012425145B2

United States Patent
Zhou et al.

(10) Patent No.: US 12,425,145 B2
(45) Date of Patent: *Sep. 23, 2025

(54) TECHNIQUES FOR BEAMFORMING FOR MULTIPLE COMPONENT CARRIERS IN WIRELESS COMMUNICATIONS

(71) Applicant: QUALCOMM Incorporated, San Diego, CA (US)

(72) Inventors: Yan Zhou, San Diego, CA (US); Tao Luo, San Diego, CA (US); Hamed Pezeshki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 18/067,301

(22) Filed: Dec. 16, 2022

(65) Prior Publication Data

US 2023/0121713 A1  Apr. 20, 2023

Related U.S. Application Data

(63) Continuation of application No. 17/091,453, filed on Nov. 6, 2020, now Pat. No. 11,588,592.

(60) Provisional application No. 62/937,176, filed on Nov. 18, 2019.

(51) Int. Cl.
*H04L 5/00* (2006.01)
*H04W 72/044* (2023.01)
*H04W 72/51* (2023.01)

(52) U.S. Cl.
CPC ......... *H04L 5/0023* (2013.01); *H04W 72/044* (2013.01); *H04W 72/51* (2023.01)

(58) Field of Classification Search
CPC .... H04L 5/0023; H04W 72/51; H04W 72/044
See application file for complete search history.

(56) References Cited

U.S. PATENT DOCUMENTS

| 10,505,602 | B1 | 12/2019 | Khan |
| 10,849,134 | B2 | 11/2020 | Islam et al. |
| 10,925,062 | B2 | 2/2021 | Liu et al. |
| 11,258,575 | B2 | 2/2022 | Abedini et al. |
| 2014/0185481 | A1 | 7/2014 | Seol et al. |
| 2017/0366994 | A1 | 12/2017 | Akkarakaran et al. |

(Continued)

FOREIGN PATENT DOCUMENTS

| CN | 108809600 A | 11/2018 |
| WO | 2018084987 | 5/2018 |

OTHER PUBLICATIONS

Google_search_QCL_17091453, Performed on Feb. 22, 2022, (Year: 2022).

(Continued)

*Primary Examiner* — Ajay Cattungal
(74) *Attorney, Agent, or Firm* — ArentFox Schiff LLP

(57) ABSTRACT

Some aspects described herein relate to transmitting, by a first node to a second node, indications of one or more groups of component carriers (CCs) that share a beamformer at the first node. Some aspects additionally or alternatively relate to receiving, by the first node from the second node, indications of one or more groups of CCs that share a beamformer at the second node. The nodes may beamform antenna resources for communications based on the indications.

30 Claims, 8 Drawing Sheets

(56) References Cited

U.S. PATENT DOCUMENTS

| | | |
|---|---|---|
| 2018/0278392 A1 | 9/2018 | Onggosanusi et al. |
| 2019/0082333 A1 | 3/2019 | Malik et al. |
| 2019/0089443 A1 | 3/2019 | Malik et al. |
| 2019/0140811 A1 | 5/2019 | Abedini et al. |
| 2019/0239092 A1 | 8/2019 | Zhou et al. |
| 2019/0239245 A1 | 8/2019 | Davydov et al. |
| 2019/0335477 A1 | 10/2019 | Nam et al. |
| 2019/0349867 A1 | 11/2019 | Molavianjazi et al. |
| 2019/0357249 A1 | 11/2019 | Davydov et al. |
| 2020/0007292 A1 | 1/2020 | Huang et al. |
| 2020/0195320 A1 | 6/2020 | Raghavan et al. |
| 2020/0229008 A1 | 7/2020 | Islam et al. |
| 2020/0314663 A1 | 10/2020 | Wang et al. |
| 2020/0371229 A1 | 11/2020 | Levitan et al. |
| 2021/0050893 A1 | 2/2021 | Park et al. |
| 2021/0067979 A1 | 3/2021 | Rahman et al. |
| 2021/0083750 A1 | 3/2021 | Mohiuddin et al. |
| 2021/0084625 A1* | 3/2021 | Ryu ............... H04W 56/0005 |
| 2021/0144716 A1 | 5/2021 | Choi et al. |
| 2021/0152299 A1 | 5/2021 | Zhou et al. |
| 2021/0185686 A1* | 6/2021 | Bai ............... H04L 25/0224 |
| 2021/0266898 A1* | 8/2021 | Cha ............... H04W 24/10 |
| 2021/0385807 A1 | 12/2021 | Rahman et al. |
| 2021/0385896 A1 | 12/2021 | Kim |
| 2022/0022180 A1 | 1/2022 | Rahman et al. |
| 2023/0121713 A1* | 4/2023 | Zhou ............... H04B 7/086 |
| | | 370/329 |

OTHER PUBLICATIONS

International Preliminary Report on Patentability—PCT/US2020/059681, The International Bureau of WIPO—Geneva, Switzerland, Jun. 2, 2022.

International Search Report and Written Opinion—PCT/US2020/059681—ISA/EPO—Mar. 18, 2021.

Partial International Search Report—PCT/US2020/059681—ISA/EPO—Feb. 5, 2021.

Zte, et al., "Remaining Details on QCL", 3GPP Draft, 3GPP TSG RAN WG1 Meeting #91, R1-1719546, Remaining Details on QCL, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051369360, pp. 1-4, Section 4, the whole document.

* cited by examiner

TECHNIQUES FOR BEAMFORMING FOR MULTIPLE COMPONENT CARRIERS IN WIRELESS COMMUNICATIONS

CLAIM OF PRIORITY UNDER 35 U.S.C. § 119

The present application for patent is a continuation of patent application Ser. No. 17/091,453, entitled "TECHNIQUES FOR BEAMFORMING FOR MULTIPLE COMPONENT CARRIERS IN WIRELESS COMMUNICATIONS" filed Nov. 6, 2020, which claims priority to Provisional Patent Application No. 62/937,176, entitled "TECHNIQUES FOR BEAMFORMING FOR MULTIPLE COMPONENT CARRIERS IN WIRELESS COMMUNICATIONS" filed Nov. 18, 2019, which are assigned to the assignee hereof and hereby expressly incorporated by reference herein for all purposes.

BACKGROUND

Aspects of the present disclosure relate generally to wireless communication systems, and more particularly, to beamforming for multiple component carriers (CCs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, nodes can communicate, concurrently or otherwise, over multiple CCs using the wireless communication technology. In addition, in 5G, nodes can beamform antenna resources to achieve a spatial direction in transmitting or receiving signals. In this regard, a receiving node can beamform antenna resources towards a transmitting node to receive signals from the transmitting node. In addition, the transmitting node can beamform antenna resources towards the receiving node to transmit signals to the receiving node.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, by a first node to a second node, a first indication of at least a first group of component carriers (CCs) that share an analog receiver beamformer at the first node, receiving, by the first node from the second node, a second indication of at least a second group of CCs that share an analog receiver beamformer at the second node, and beamforming, by the first node and based on the second indication, signals transmitted to the second node over each of the CCs in the second group of CCs using the same analog transmitter beamformer.

In another example, an apparatus for wireless communication is provided that includes a transceiver, a memory configured to store instructions, and one or more processors communicatively coupled with the transceiver and the memory. The one or more processors are configured to transmit, to a second apparatus, a first indication of at least a first group of component carriers (CCs) that share an analog receiver beamformer at the apparatus, transmit, to the second apparatus, a second indication of at least a second group of CCs that share an analog transmitter beamformer at the apparatus, beamform, based on the first indication, antenna resources for receiving signals from the second apparatus over each of the CCs in the first group of CCs using the same analog receiver beamformer, and beamform, based on the second indication, antenna resources for transmitting signals to the second apparatus over each of the CCs in the second group of CCs using the same analog transmitter beamformer.

In another example, an apparatus for wireless communication is provided that includes means for transmitting, to a second apparatus, a first indication of at least a first group of CCs that share an analog receiver beamformer at the apparatus, means for transmitting, to the second apparatus, a second indication of at least a second group of CCs that share an analog transmitter beamformer at the apparatus, means for beamforming, based on the first indication, antenna resources for receiving signals from the second apparatus over each of the CCs in the first group of CCs using the same analog receiver beamformer, and means for beamforming, based on the second indication, antenna resources for transmitting signals to the second apparatus over each of the CCs in the second group of CCs using the same analog transmitter beamformer.

In another example, a computer-readable medium, including code executable by one or more processors for wireless communication is provided. The code includes code for transmitting, by a first node to a second node, a first indication of at least a first group of CCs that share an analog receiver beamformer at the first node, transmitting, by the first node to the second node, a second indication of at least a second group of CCs that share an analog transmitter beamformer at the first node, beamforming, by the first node and based on the first indication, antenna resources for receiving signals from the second node over each of the CCs in the first group of CCs using the same analog receiver beamformer, and beamforming, by the first node and based on the second indication, antenna resources for transmitting signals to the second node over each of the CCs in the second group of CCs using the same analog transmitter beamformer.

In another example, an apparatus for wireless communication is provided that includes a transceiver, a memory configured to store instructions, and one or more processors communicatively coupled with the transceiver and the memory. The one or more processors are configured to transmit, to a second node, a first indication that at least a first group of CCs in different frequency bands share a beamformer at the first node, receive, from the second node, a configuration indicating the first group of CCs to use for communicating with the second node, wherein the first group of CCs includes a first CC in a first frequency band and a second CC in a second frequency band, wherein the first frequency band and the second frequency band are different frequency bands, and beamform, by the first node and based on the first indication, antenna resources for at least one of transmitting signals to, or receiving signals from, the second node over each of the CCs in the first group of CCs using the beamformer.

In another example, a method for wireless communication is provided that includes transmitting, by a first node to a second node, a first indication that at least a first group of CCs in different frequency bands share a beamformer at the first node, receiving, by the first node from the second node, a configuration indicating the first group of CCs to use for communicating with the second node, wherein the first group of CCs includes a first CC in a first frequency band and a second CC in a second frequency band, wherein the first frequency band and the second frequency band are different frequency bands, and beamforming, by the first node and based on the first indication, antenna resources for at least one of transmitting signals to, or receiving signals from, the second node over each of the CCs in the first group of CCs using the beamformer.

In another example, an apparatus for wireless communication is provided that includes a transceiver, a memory configured to store instructions, and one or more processors communicatively coupled with the transceiver and the memory. The one or more processors are configured to receive, from a second node, a first indication that at least a first group of component carriers (CCs) in different frequency bands share a beamformer at the first node, transmit, to the second node, a configuration indicating the first group of CCs to use for communicating with the second node, wherein the first group of CCs includes a first CC in a first frequency band and a second CC in a second frequency band, wherein the first frequency band and the second frequency band are different frequency bands, and beamform, by the first node and based on the first indication, antenna resources for at least one of transmitting signals to, or receiving signals from, the second node over each of the CCs in the first group of CCs using the beamformer.

In another example, a method for wireless communication is provided that includes receiving, by a first node and from a second node, a first indication that at least a group of CCs in different frequency bands share a beamformer at the first node, transmitting, by the first node and to the second node, a configuration indicating the group of CCs to use for communicating with the second node, wherein the group of CCs includes a first CC in a first frequency band and a second CC in a second frequency band, wherein the first frequency band and the second frequency band are different frequency bands, and beamforming, by the first node and based on the first indication, antenna resources for at least one of transmitting signals to, or receiving signals from, the second node over each of the CCs in the group of CCs using the beamformer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
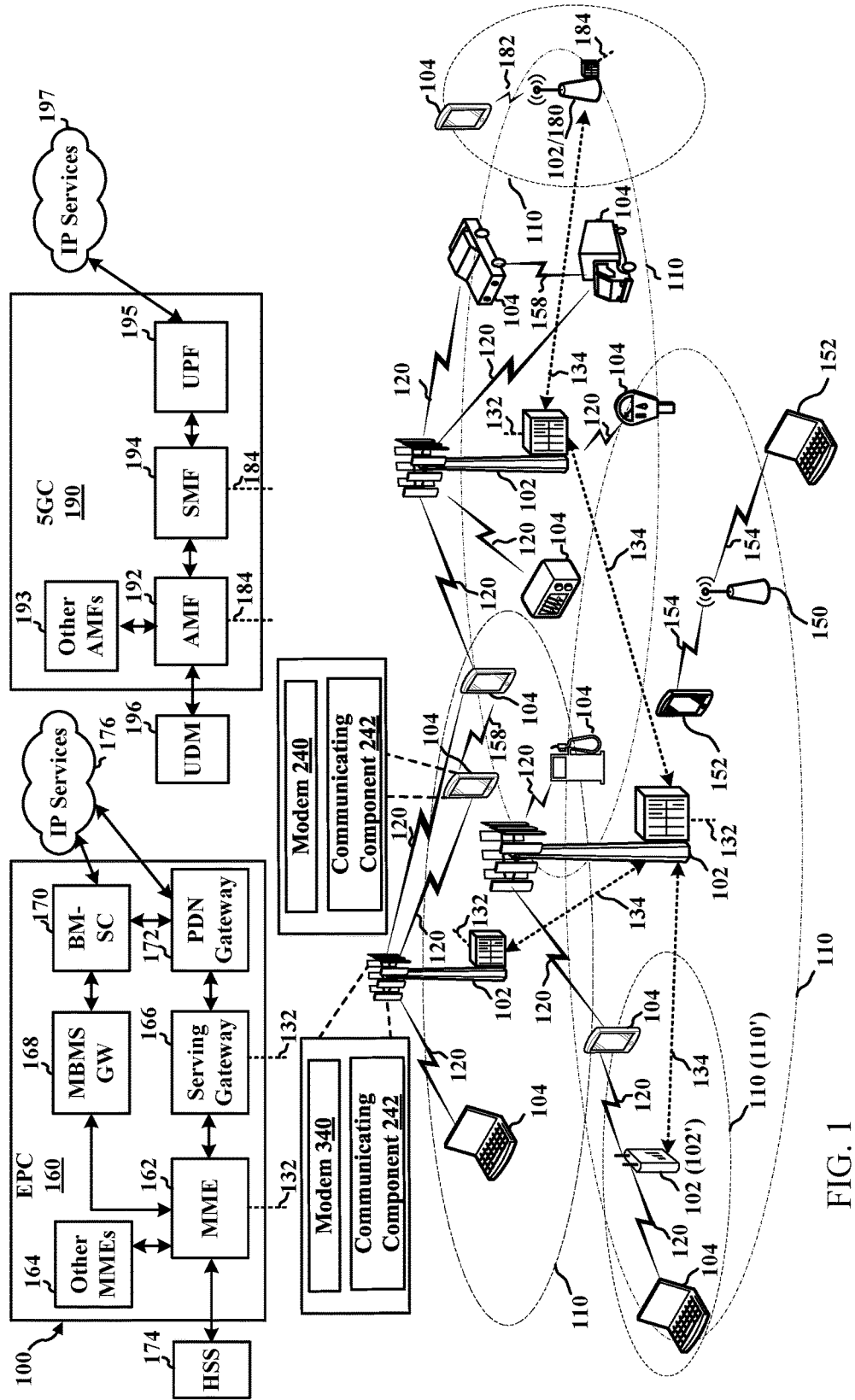
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to indicating, by one or more nodes in wireless communications with one another, component carriers (CCs) having the same analog beamformer. The analog beamformer can include a beamforming of antenna resources performed by the node to achieve a spatial direction for receiving signals from, or transmitting signals to, other nodes. The analog beamformer can accordingly be one of an analog receiver beamformer, referring to a beamforming of antenna resources to generate a directional beam for receiving wireless communication, or an analog transmitter beamformer, referring to a beamforming of antenna resources to generate a directional beam for transmitting wireless communication. Beamforming antenna resources can include applying power, controlling phase, controlling amplitude, etc. of multiple antennas in an antenna array to achieve the desired spatial direction. Beamforming may be performed based on a beamforming matrix that can specify values for applying the power, controlling the phase, controlling the amplitude, etc. of the multiple antennas.

For example, a first node can indicate, to a second node, multiple CCs that have the same analog receiver beamformer at the first node. In this example, the second node can beamform, based on the indication from the first node, antenna resources for transmissions over the multiple CCs using the same analog transmitter beamformer (which may correspond to the analog receiver beamformer). Similarly, the first node may also receive, from the second node, an indication of multiple CCs that have the same analog receiver beamformer at the second node (which may be the same or a different set of CCs indicated by the first node). In this example, the first node can beamform, based on the indication from the second node, antenna resources for transmissions over the multiple CCs using the same analog transmitter beamformer (which may correspond to the analog receiver beamformer indicated by the second node). In another example, the first node can indicate, to the second node, multiple CCs that have the same analog transmitter beamformer at the first node. In this example, the second node can beamform, based on the indication, antenna resources to receive signals from the first node as well. In addition, in an example, the first node can be a user equipment (UE) and the second node may be an access point, or vice versa, as described further herein.

In one example, an access point can configure a UE with a list of CCs that are associated with one another as having the same transmission configuration indicator (TCI) state for receiving downlink communications. The TCI state can indicate or otherwise relate to parameters for performing beamforming, and thus the UE can receive the list of CCs and determine beamforming to be performed for the list of CC based on the indicated TCI state. A UE receiving this configuration from the access point can apply a same set of TCI state identifiers for the CCs in the list (e.g., and/or for all bandwidth parts (BWPs) of each CC in the list). Similarly, in an example, an access point can configure a UE with a list of CCs that are associated with one another as having the having the same spatial relation on uplink. A UE receiving this configuration from the access point can apply the same spatial relation for antenna resources for transmitting uplink communications over the CCs in the list (e.g., and/or for all BWPs of each CC in the list).

In examples described herein, the access point can advertise or otherwise configure, to the UE, each group of CCs sharing the same analog receiver beamformer at the access point (e.g., the same spatial relation) so the UE can try to use the same analog transmitter beamformer for transmitting uplink communications to the access point over each of the CCs in the group of CCs. In another example, the UE can indicate, to the access point, each group of CCs sharing the same analog receiver beamformer at the UE (e.g., the same quasi-colocation (QCL) assumption). In one example, based on the indication, the access point can try to use the same analog transmitter beamformer for transmitting downlink communications to the UE over each of the CCs in the group of CCs. In another example, the UE may separately indicate, to the access point, each group of CCs sharing the same analog transmitter beamformer at the UE. In this example, based on the indication, the access point can try to use the same analog receiver beamformer for receiving uplink communications from the UE over each of the CCs in the group of CCs. In any case, indicating the list of CCs by both nodes can allow each node to beamform antenna resources for communications over the CCs to each other, which can improve quality and/or hearability of the communications over the CCs.

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting and/or receiving indications of groups of CCs that share the same analog beamformer and/or for accordingly beamforming antenna resources to transmit and/or receive signals over the CCs in the groups of CCs. Though a UE 104 and a base station 102 are shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can indicate, to a base station 102, groups of CCs that share the same analog beamformer at the UE 104 (e.g., the same analog receiver beamformer or the same transmitter beamformer). Communicating component 242 of the base station 102 can accordingly apply a corresponding analog beamformer (e.g., a corresponding analog transmitter beamformer or a corresponding analog receiver beamformer) in communicating with the UE 104. Similarly, communicating component 242 of a base station 102 can indicate, to a UE 104, groups of CCs that share the same analog beamformer at the base station 102 (e.g., the same analog receiver beamformer or the same transmitter beamformer). Communicating component 242 of the UE 104 can accordingly apply a corresponding analog beamformer (e.g., a corresponding analog transmitter beamformer or a corresponding analog receiver beamformer) in communicating with the base station 102.

Turning now to FIGS. 2-8, aspects are depicted with reference to one or more components and one or more methods that may perform the actions or operations described herein, where aspects in dashed line may be optional. Although the operations described below in FIGS.

4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
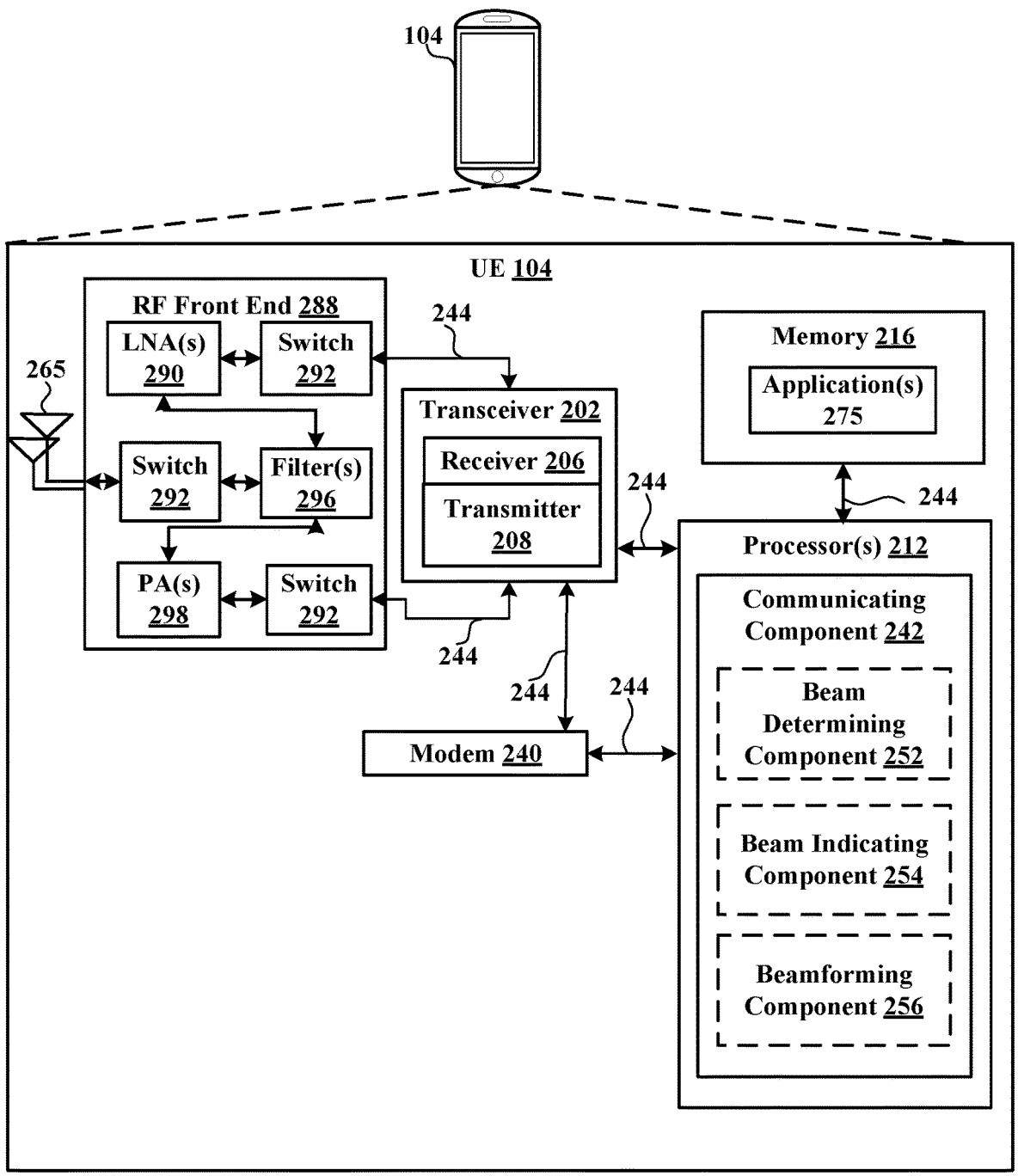
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting and/or receiving indications of groups of CCs that share the same analog beamformer and/or for accordingly beamforming antenna resources to transmit and/or receive signals over the CCs in the groups of CCs, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a beam determining component 252 for determining an analog beamformer for a group of CCs (e.g., as received in an indication from another node or otherwise), a beam indicating component 254 for indicating the analog beamformer for the group of CCs, and/or a beamforming component 256 for beamforming antenna resources based on the received or indicated analog beamformer, as described herein.

In an aspect, the processor(s) 212 may correspond to one or more of the processors described in connection with the UE in FIG. 8. Similarly, the memory 216 may correspond to the memory described in connection with the UE in FIG. 8.

Figure 3:
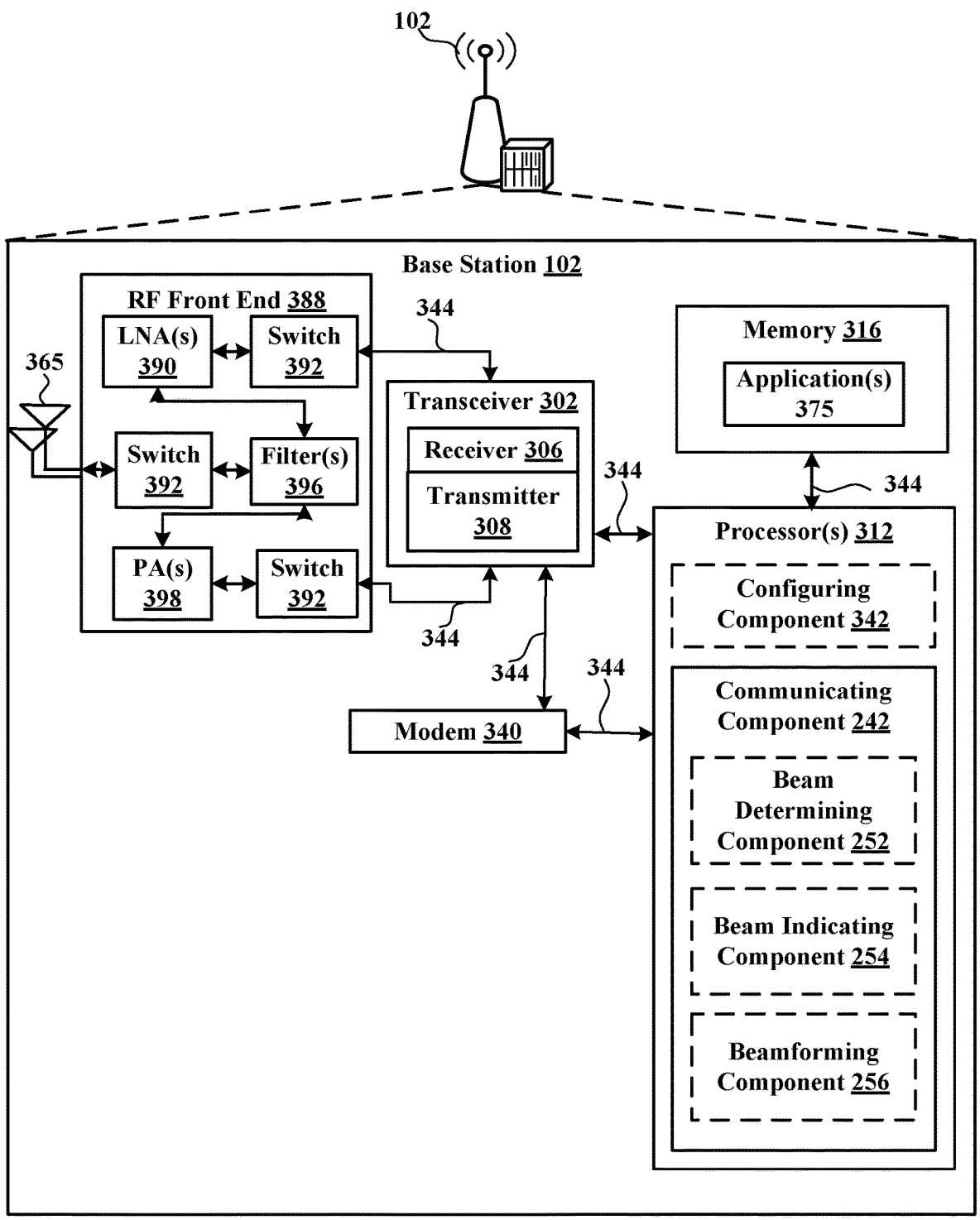
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340, communicating component 242 for transmitting and/or receiving indications of groups of CCs that share the same analog beamformer and/or for accordingly beamforming antenna resources to transmit and/or receive signals over the CCs in the groups of CCs, and/or an optional configuring component 342 for configuring lists of CCs (e.g., having the same QCL assumption, spatial relation, or otherwise), as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, communicating component 242 can optionally include a beam determining component 252 for determining an analog beamformer for a group of CCs (e.g., as received in an indication from another node or otherwise), a beam indicating component 254 for indicating the analog beamformer for the group of CCs, and/or a beamforming component 256 for beamforming antenna resources based on the received or indicated analog beamformer, as described above and further herein.

In an aspect, the processor(s) 312 may correspond to one or more of the processors described in connection with the base station in FIG. 8. Similarly, the memory 316 may correspond to the memory described in connection with the base station in FIG. 8.

Figure 4:
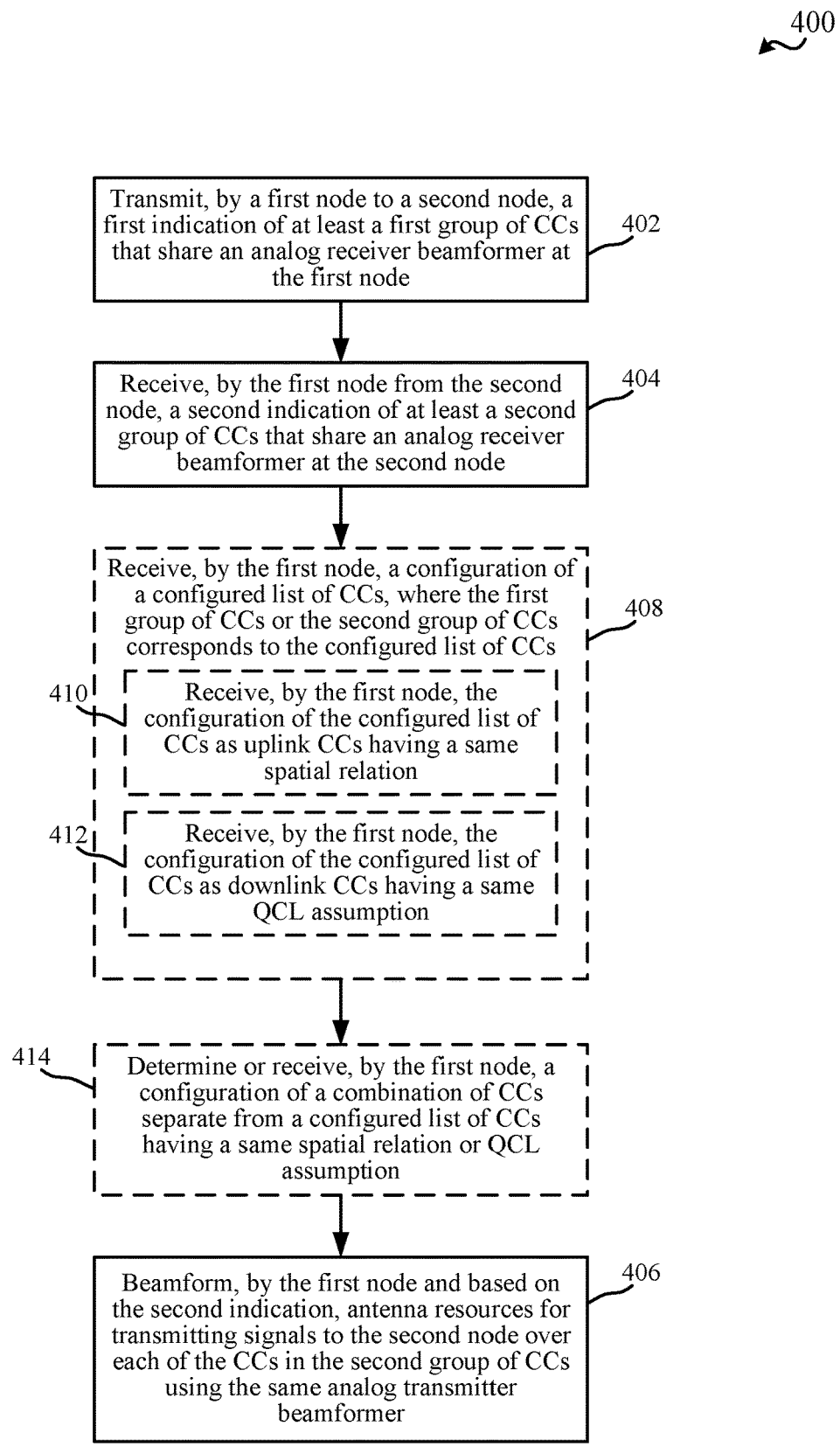
FIG. 4 is a flow chart illustrating an example of a method for indicating and/or determining groups of component carriers that share the same analog beamformer, in accordance with various aspects of the present disclosure.
Figure 5:
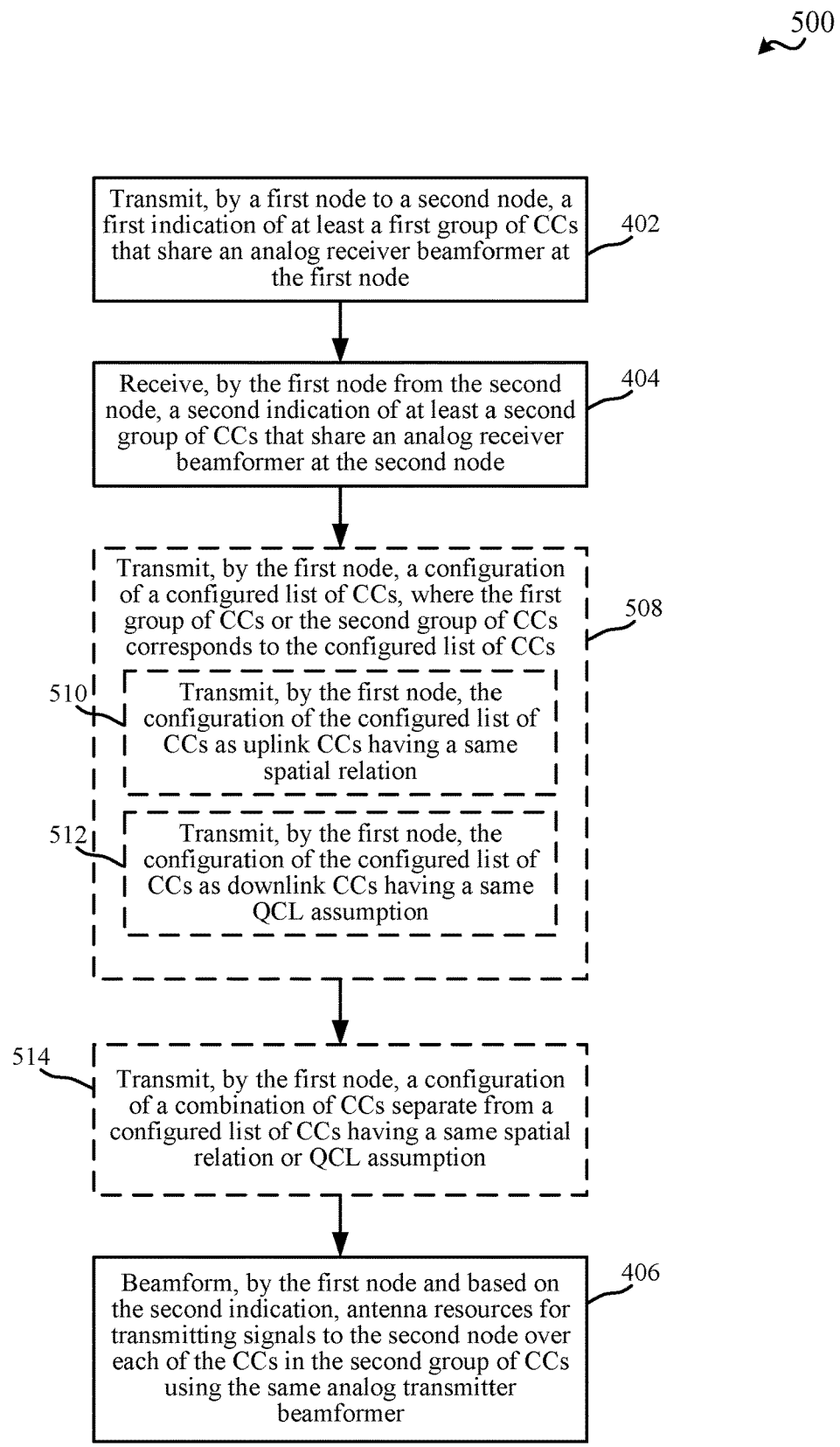
FIG. 5 is a flow chart illustrating another example of a method for indicating and/or determining groups of component carriers that share the same analog beamformer, in accordance with various aspects of the present disclosure.

FIGS. 4 and 5 illustrate flow charts of examples of methods 400 and 500 for indicating analog beamformers used in wireless communications. In an example, a UE (e.g., UE 104) can perform the functions described in method 400 using one or more of the components described in FIGS. 1 and 2, and/or a base station (e.g., base station 102) can perform the functions described in method 500 using one or more of the components described in FIGS. 1 and 3. In one non-limiting example, each of a UE 104 and base station 102 in communication with one another (e.g., as the first and second nodes in FIGS. 4 and 5, and described below) can respectively perform the functions described in method 400 and 500, though the methods 400 and 500 are not required to be performed in conjunction.

In methods 400 and 500, at Block 402, a first indication of at least a first group of CCs that share an analog receiver beamformer at a first node can be transmitted by the first node to a second node. In an aspect, beam indicating component 254, e.g., in conjunction with processor(s) 212/312, memory 216/316, transceiver 202/302, communicating component 242, etc., can transmit, by the first node to the second node, the first indication of at least the first group of CCs that share an analog receiver beamformer at the first node. For example, beam indicating component 254 can transmit the first indication including identifying information of the first group of CCs that are grouped for having the same analog receiver beamformer. The analog receiver beamformer can correspond to the beamformer (e.g., beamforming matrix or other indication of beamforming antenna resources at the first node) used by the first node in receiving communications from the second node over the first group of CCs. In one example, the first group of CCs may correspond to a configured list of CCs, as described further herein, or can be unrelated to the configured list of CCs, or can include a subset of the configured list of CCs. In any case, transmitting the indication for the first group of CCs can allow the second node to similarly beamform antenna resources for transmissions to the first node over the first group of CCs using an analog transmitter beamformer that corresponds to the indicated analog receiver beamformer (e.g., the same or otherwise reciprocal beamformer to achieve the same or opposite spatial direction to transmit towards the first node).

In an example, the analog receiver beamformer (and/or analog transmitter beamformer) can be inferred based on a known analog beamformer for one of the CCs in the first group of CCs.

In methods 400 and 500, at Block 404, a second indication of at least a second group of CCs that share an analog receiver beamformer at the second node can be received by the first node from the second node. In an aspect, beam determining component 252, e.g., in conjunction with processor(s) 212/312, memory 216/316, transceiver 202/302, communicating component 242, etc., can receive, by the first node from the second node, the second indication of at least the second group of CCs that share an analog receiver beamformer at the second node. For example, beam determining component 252 can receive the second indication including identifying information of the second group of CCs that are grouped for having the same analog receiver beamformer at the second node. The analog receiver beamformer can correspond to the beamformer (e.g., beamforming matrix or other indication of beamforming antenna resources at the second node) used by the second node in receiving communications from the first node over the second group of CCs. In one example, the second group of CCs may correspond to a configured list of CCs, as described further herein, or can be unrelated to the configured list of CCs, or can include a subset of the configured list of CCs. In any case, receiving the indication for the second group of CCs can allow the first node to beamform antenna resources for transmissions to the second node over the second group of CCs using an analog transmitter beamformer that corresponds to the indicated analog receiver beamformer (e.g., the same or otherwise reciprocal beamformer to achieve the same or opposite spatial direction to transmit towards the second node), as described further herein.

In one example, beam determining component 252 can infer the analog receiver beamformer (and/or analog transmitter beamformer) based on a known analog beamformer for one of the CCs in the first group of CCs. In addition, for example, the first group of CCs may be the same or different as the second group of CCs. In an example, the first group of CCs may include a portion of the second group of CCs and/or vice versa, as described further herein.

In methods 400 and 500, at Block 406, antenna resources for transmitting signals to the second node over each of the CCs in the second group of CCs can be beamformed, by the first node and based on the second indication, using the same analog transmitter beamformer. In an aspect, beamforming component 256, e.g., in conjunction with processor(s) 212/312, memory 216/316, transceiver 202/302, communicating component 242, etc., can beamform, by the first node and based on the second indication, antenna resources for transmitting signals to the second node over each of the CCs in the second group of CCs using the same analog transmitter beamformer. For example, beam determining component 252 can determine the analog transmitter beamformer that corresponds to the analog receiver beamformer received in the indication at Block 404, and beamforming component 256 can accordingly use this analog transmitter beamformer in transmitting communications over the second group of CCs.

In a specific example, e.g., in method 400, the first node can be a UE 104 and the second node can be a base station 102 (e.g., a gNB). In this example, the UE 104 can transmit, to the base station 102, the first indication of the first group of CCs that share an analog receiver beamformer and can receive, from the base station 102, the second indication of the second group of CCs that share an analog receiver beamformer. Thus, for example, the base station 102 can beamform antenna resources for downlink transmissions for the UE 104 over the first group of CCs based on an analog transmitter beamformer that corresponds to the analog receiver beamformer of the first indication. Similarly, in this example, the UE 104 can beamform antenna resources for uplink transmissions for the base station 102 over the second group of CCs based on an analog transmitter beamformer that corresponds to the analog receiver beamformer of the second indication. As described, the first and second groups of CCs can be the same or different groups of CCs. Additionally, as described further herein, the base station 102 may configure the UE 104 with one or more lists of CCs, and the first and/or second groups of CCs may correspond to one of the lists of CCs or may be separate from the one or more lists of CCs.

For example, in method 400 being performed by a UE (e.g., as the first node), optionally at Block 408, a configuration of a configured list of CCs can be received, by the first node, where the first group of CCs or the second group of CCs corresponds to the configured list of CCs. In an aspect, beam determining component 252, e.g., in conjunction with processor(s) 212, memory 216, transceiver 202, communicating component 242, etc., can receive, by the first node, the configuration of configured list of CCs, where the first group of CCs or the second group of CCs corresponds to the configured list of CCs.

In receiving the configuration at Block 408, optionally at Block 410, the configuration of the configured list of CCs as uplink CCs having a same spatial relation can be received by the first node (e.g., by the UE 104 and from base station 102). In an aspect, beam determining component 252, e.g., in conjunction with processor(s) 212, memory 216, transceiver 202, communicating component 242, etc., can receive, by the first node (e.g., UE 104), the configuration of the configured list of CCs as uplink CCs having a same spatial relation. For example, the configured list of CCs can be received from the base station 102 and can be indicated as having the same spatial relation, as described above. In one example, the first or second groups of CCs can correspond to one of the configured lists in this example.

In addition, for example, in receiving the configuration at Block 408, optionally at Block 412, the configuration of the configured list of CCs as downlink CCs having a same QCL assumption can be received by the first node (e.g., by the UE 104 and from base station 102). In an aspect, beam determining component 252, e.g., in conjunction with processor (s) 212, memory 216, transceiver 202, communicating component 242, etc., can receive, by the first node (e.g., UE 104), the configuration of the configured list of CCs as downlink CCs having a same QCL assumption. For example, the configured list of CCs can be received from the base station 102 and can be indicated as having the same QCL assumption, as described above. In one example, the first or second groups of CCs can correspond to one of the configured lists in this example.

For example, the configured list(s) of CCs can include one or more lists of CCs indicated as having the same TCI state (e.g., for all BWPs of each of the CCs). For example, when a set of TCI state identifiers (ID)s for physical downlink shared channel (PDSCH) are activated by a media access control (MAC) control element (CE) for a set of CCs/BWPs at least for the same band, where the applicable list of CCs is indicated by radio resource control (RRC) signaling, the same set of TCI state IDs can be applied for the all BWPs in the indicated CCs. For the purpose of simultaneous TCI state activation across multiple CCs/BWPs, in one example, up to two lists of CCs can be configured by RRC per UE, and the applied list can be determined by the indicated CC in the MAC CE. In one example, the at least one list of CCs can correspond to one of the up to two lists in this example, indicated as having the same TCI state identifier.

For example, the indicated groups of CCs (e.g., the first group and/or the second group) may include the configured list of CCs or may be different. For example, where the first node is the UE, transmitting the first indication (e.g., at Block 402) may include transmitting an identifier of the configured list of downlink CCs associated with the first group of CCs in the first indication. Similarly, receiving the second indication (e.g., at Block 404) may include receiving, from the access point, the second indication, which may include an identifier of the configured list of uplink CCs to which the second group of CCs corresponds. Thus, analog beamformers can be indicated for one or more of the configured lists of CCs in this example, and the nodes can accordingly identify the CCs for which to apply the same analog beamformer.

In another example, as described further herein, the configured list(s) of CCs can be generated based on the identified first group of CCs (e.g., based on the first indication transmitted at Block 402) and/or based on the identified second group of CCs (e.g., based on the second indication received at Block 404). In one example, the received configuration of configured lists of CCs having the same special relation or QCL assumption may be identified in the configuration based on the first indication or the second indication.

In an example, the configuration of the configured list of CCs may be based on the first indication transmitted at Block 402 and/or the second indication received at Block 404. For example, where the UE indicates that a group of CCs can share an analog receiver beamformer, the base station 102 can configure the group of CCs as having the same analog beamformer (or spatial relation or QCL assumption, etc.), and can transmit the configuration of the group of CCs to the UE 104.

In method 400, optionally at Block 414, a configuration of a combination of CCs separate from a configured list of CCs having a same spatial relation or QCL assumption can be determined or received. In an aspect, beam determining component 252, e.g., in conjunction with processor(s) 212, memory 216, transceiver 202, communicating component 242, etc., can determine or receive (e.g., from the base station 102), the configuration of the combination of CCs separate from the configured list of CCs having a same spatial relation or QCL assumption. The combination of CCs that is separate from the configured list(s) can include a combination of CCs, which can be combined for various other purposes, which may or may not include the purpose of using the same analog beamformer. Moreover, the combination of CCs may include CCs of the same or different frequency bands. Additionally, for example, beam determining component 252 can determine the combination of CCs from memory 216 (e.g., based on a standard for implementing the UE 104 that indicates the combination of CCs) or may receive a configuration (e.g., over RRC signaling from the access point) that indicates the combination of CCs.

In any case, for example, the indicated groups of CCs (e.g., the first group and/or the second group) may include the combination of CCs or a subset thereof. For example, where the first node is the UE, transmitting the first indication (e.g., at Block 402) may include transmitting an identifier of the combination of CCs, as configured, that are associated with the first group of CCs in the first indication. Similarly, receiving the second indication (e.g., at Block 404) may include receiving, from the access point, the second indication, which may include an identifier of the combination of CCs, as configured, to which the second group of CCs corresponds. Thus, analog beamformers can be indicated for the configured combinations of CCs in this example, and the nodes can accordingly identify the CCs for which to apply the same analog beamformer based on the identifier.

In another example, the indicated groups of CCs may be a subset of a configured combination of CCs. For example, where the first node is the UE, transmitting the first indication (e.g., at Block 402) may include transmitting an identifier of a subset of a combination of CCs, as configured, that are associated with the first group of CCs in the first indication. Similarly, receiving the second indication (e.g., at Block 404) may include receiving, from the access point, the second indication, which may include an identifier of a subset of the combination of CCs, as configured, to which the second group of CCs corresponds. Thus, analog beamformers can be indicated for the subsets of configured combinations of CCs in this example, and the nodes can accordingly identify the CCs for which to apply the same analog beamformer based on an identifier. For example, the identifier may identify indices of CCs in the combination that are associated with the first or second group of CCs.

For example, in method 500 being performed by a base station (e.g., as the first node), optionally at Block 508, a configuration of a configured list of CCs can be transmitted, by the first node, where the first group of CCs or the second group of CCs corresponds to the configured list of CCs. In an aspect, configuring component 342, e.g., in conjunction with processor(s) 312, memory 316, transceiver 302, etc., can transmit, by the first node, the configuration of the configured list of CCs, where the first group of CCs or the second group of CCs corresponds to the configured list of CCs.

In transmitting the configuration at Block 508, optionally at Block 510, the configuration of the configured list of CCs as uplink CCs having a same spatial relation can be transmitted by the first node. In an aspect, configuring component 342, e.g., in conjunction with processor(s) 312, memory 316, transceiver 302, etc., can transmit, by the first node (e.g., base station 102), the configuration of the configured list of CCs as uplink CCs having a same spatial relation.

In transmitting the configuration at Block 508, optionally at Block 512, the configuration of the configured list of CCs as downlink CCs having a same QCL assumption can be transmitted by the first node. In an aspect, configuring component 342, e.g., in conjunction with processor(s) 312, memory 316, transceiver 302, etc., can transmit, by the first node (e.g., base station 102), the configuration of the configured list of CCs as downlink CCs having a same QCL assumption.

For example, the indicated groups of CCs (e.g., the first group and/or the second group) may include the configured list of CCs or may be different. For example, where the first node is the base station 102, transmitting the first indication (e.g., at Block 502) may include transmitting an identifier of the configured list of uplink CCs associated with the first group of CCs in the first indication. Similarly, receiving the second indication (e.g., at Block 504) may include receiving, from the UE, the second indication, which may include an identifier of the configured list of downlink CCs to which the second group of CCs corresponds. Thus, analog beamformers can be indicated for one or more of the configured lists of CCs in this example, and the nodes can accordingly identify the CCs for which to apply the same analog beamformer.

In another example, configuring component 342 can generate the configured list(s) of CCs based on the identified first group of CCs (e.g., based on the first indication transmitted at Block 502) and/or based on the identified second group of CCs (e.g., based on the second indication received at Block 504). In one example, configuring component 342 can identify one or more of the configured lists of CCs, having the same special relation or QCL assumption, in the configuration by using the first indication or the second indication.

In method 500, optionally at Block 514, a configuration of a combination of CCs separate from a configured list of CCs having a same spatial relation or QCL assumption can be transmitted by the first node. In an aspect, configuring component 342, e.g., in conjunction with processor(s) 312, memory 316, transceiver 302, etc., can transmit, by the first node (e.g., base station 102), the configuration of the combination of CCs separate from the configured list of CCs having a same spatial relation or QCL assumption. The combination of CCs that is separate from the one or more configured lists can include a combination of CCs, which can be combined for various other purposes, which may or may not include the purpose of using the same analog beamformer. Moreover, the combination of CCs may include CCs of the same or different frequency bands. Additionally, for example, configuring component 342 may configure the combination(s) of CCs using RRC or other signaling.

In any case, for example, the indicated groups of CCs (e.g., the first group and/or the second group) may include the combination of CCs or a subset thereof. For example, where the first node is the base station 102, transmitting the first indication (e.g., at Block 502) may include transmitting an identifier of the combination of CCs, as configured, that are associated with the first group of CCs in the first indication. Similarly, receiving the second indication (e.g., at Block 504) may include receiving, from the UE, the second indication, which may include an identifier of the combination of CCs, as configured, to which the second group of CCs corresponds. Thus, analog beamformers can be indicated for the configured combinations of CCs in this example, and the nodes can accordingly identify the CCs for which to apply the same analog beamformer based on the identifier.

In another example, the indicated groups of CCs may be a subset of a configured combination of CCs. For example, where the first node is the access point, transmitting the first indication (e.g., at Block 502) may include transmitting an identifier of a subset of a combination of CCs, as configured, that are associated with the first group of CCs in the first indication. Similarly, receiving the second indication (e.g., at Block 504) may include receiving, from the UE, the second indication, which may include an identifier of a subset of the combination of CCs, as configured, to which the second group of CCs corresponds. Thus, analog beamformers can be indicated for the subsets of configured combinations of CCs in this example, and the nodes can accordingly identify the CCs for which to apply the same analog beamformer based on an identifier. For example, the identifier may identify indices of CCs in the combination that are associated with the first or second group of CCs.

In the examples described above, each node (gNB or UE) can inform the other node each group of CCs sharing same analog beamformer at its side. In this regard, the other node can try to use same Tx beam per CC group of the informing node. In addition, for example, instead of reporting each group of CCs sharing same analog beamformer, UE can report each group sharing same analog receiver (Rx) or transmitter (Tx) beamformer separately, which are used in downlink (DL) and uplink (UL) in frequency division duplexing (FDD) system, respectively. In addition, for example, instead of reporting each group of CCs sharing same analog beamformer, each node (gNB or UE) can report whether each CC combination uses a common analog beamformer. In this example, each CC combination can be defined in the wireless communication technology standard (e.g., 5G standard) and accordingly in a memory of the gNB or UE, or each CC combination can be indicated or configured (e.g., to the UE) by gNB, e.g. CCs per combination can be within a band or across different bands. If different analog beamformers are used in a CC combination, for example, the node can further indicate each sub-group of CCs sharing same analog beamformer.

Figure 6:
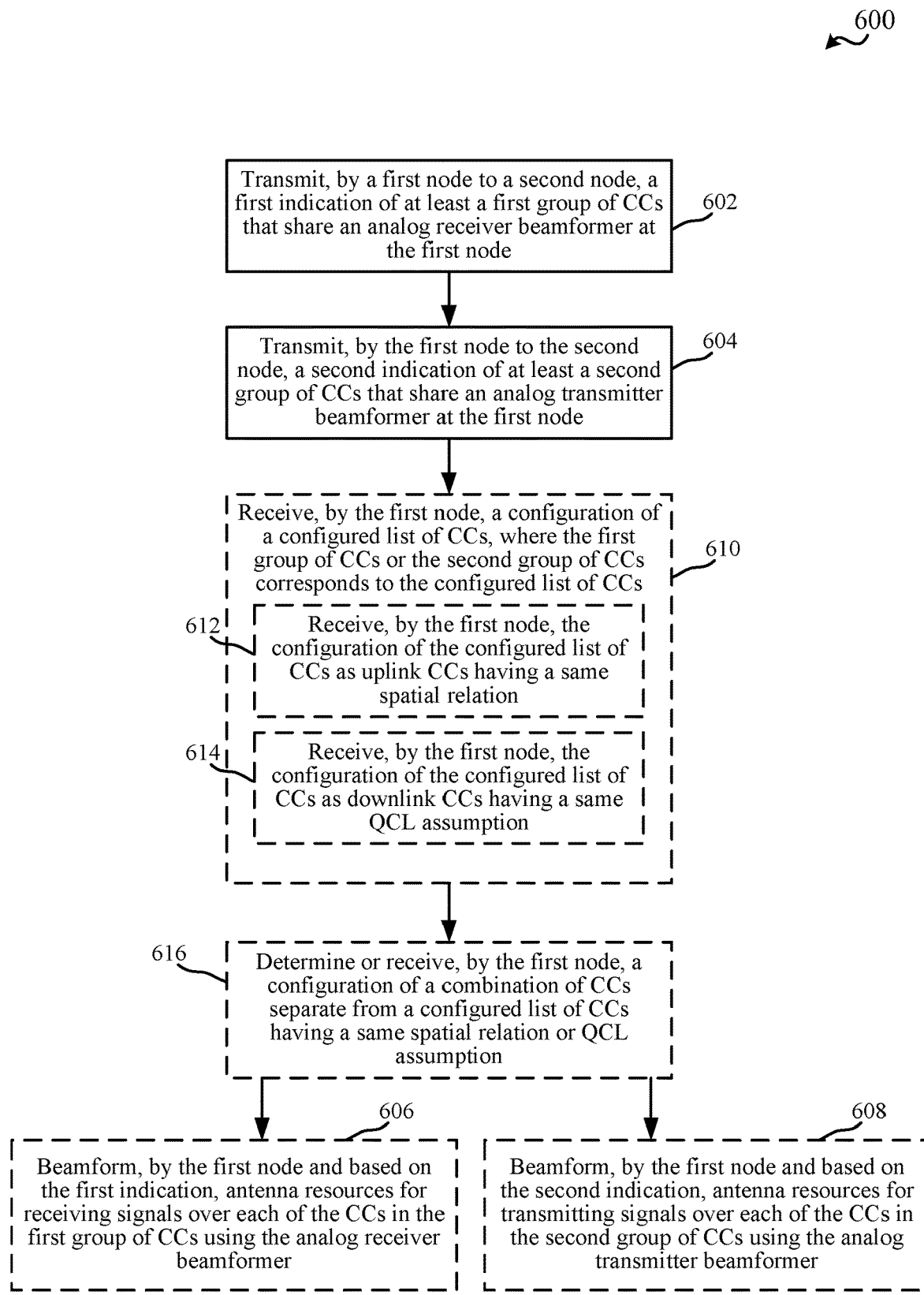
FIG. 6 is a flow chart illustrating an example of a method for separately indicating groups of component carriers that share the same analog receiver or transmitter beamformer, in accordance with various aspects of the present disclosure.
Figure 7:
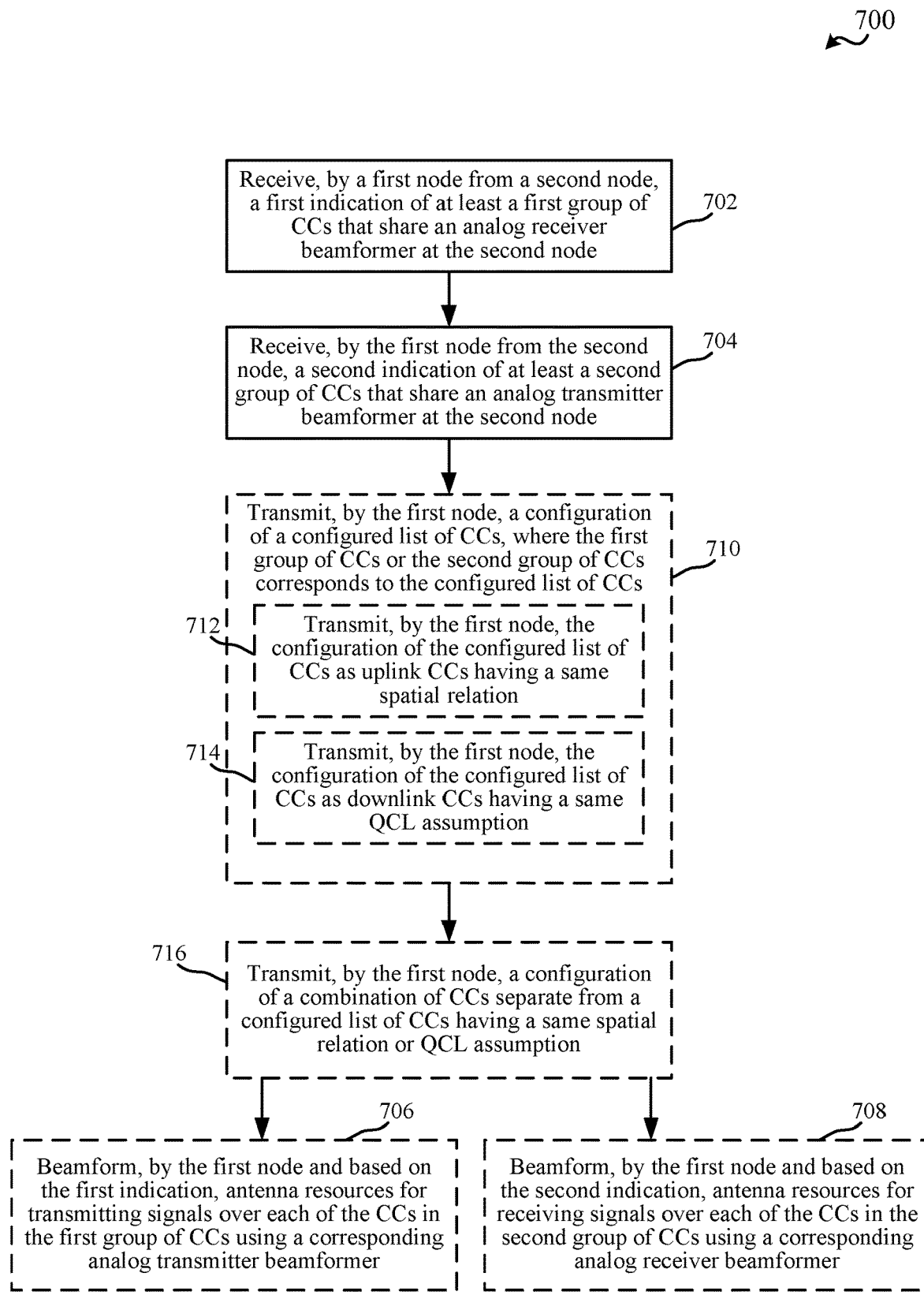
FIG. 7 is a flow chart illustrating an example of a method for separately determining groups of component carriers that share the same analog receiver or transmitter beamformer, in accordance with various aspects of the present disclosure.

FIG. 6 illustrates a flow chart of an example of a method 600 for separately indicating analog transmitter and receiver beamformers used in wireless communications. FIG. 7 illustrates a flow chart of an example of a method 700 for separately determining analog transmitter and receiver beamformers used in wireless communications. In an example, a UE (e.g., UE 104) can perform the functions described in method 600 using one or more of the components described in FIGS. 1 and 2, and/or a base station (e.g., base station 102) can perform the functions described in method 700 using one or more of the components described in FIGS. 1 and 3. In one non-limiting example, each of a UE 104 and base station 102 in communication with one another (e.g., as the first or second nodes in FIGS. 6 and 7, and described below) can respectively perform the functions described in method 600 and 700, though the methods 600 and 700 are not required to be performed in conjunction.

In method 600, at Block 602, a first indication of at least a first group of CCs that share an analog receiver beamformer at a first node can be transmitted by the first node to a second node. In an aspect, beam indicating component 254, e.g., in conjunction with processor(s) 212, memory 216, transceiver 202, communicating component 242, etc., can transmit, by the first node to the second node, the first indication of at least the first group of CCs that share an analog receiver beamformer at the first node, as described in reference to Block 402 in methods 400 and 500 of FIGS. 4 and 5 above.

In method 600, at Block 604, a second indication of at least a second group of CCs that share an analog transmitter beamformer at the first node can be transmitted by the first node to a second node. In an aspect, beam indicating component 254, e.g., in conjunction with processor(s) 212, memory 216, transceiver 202, communicating component 242, etc., can transmit, by the first node to the second node, the second indication of at least the second group of CCs that share an analog transmitter beamformer at the first node. In an example, the first group of CCs and the second group of CCs may be the same or different groups of CCs. In addition, for example, beam indicating component 254 can transmit the second indication in the same or separate transmission from the first indication. In some examples, the first indication and the second indication may be combined into a single indication to indicate a group of CCs that share a same analog transmitter beamformer and a same analog receiver beamformer.

For example, beam indicating component 254 can transmit the second indication including identifying information of the second group of CCs that are grouped for having the same analog transmitter beamformer. The analog transmitter beamformer can correspond to the beamformer (e.g., beamforming matrix or other indication of beamforming antenna resources at the first node) used by the first node in transmitting communications from the second node over the second group of CCs. In one example, the second group of CCs may correspond to a configured list of CCs, as described further herein, or can be unrelated to the configured list of CCs, or can include a subset of the configured list of CCs. In any case, transmitting the indication for the second group of CCs can allow the second node to similarly beamform antenna resources for receiving transmissions from the first node over the second group of CCs using an analog receiver beamformer that corresponds to the indicated analog transmitter beamformer (e.g., the same or otherwise reciprocal beamformer to achieve the same or opposite spatial direction to receive from the first node).

In method 700, at Block 702, a first indication of at least a first group of CCs that share an analog receiver beamformer at a second node can be received by the first node from the second node. In an aspect, beam determining component 252, e.g., in conjunction with processor(s) 312, memory 316, transceiver 302, communicating component 242, etc., can receive, by the first node from the second node, the first indication of at least the first group of CCs that share an analog receiver beamformer at the second node. For example, beam determining component 252 can receive this indication from the UE 104.

In method 700, at Block 704, a second indication of at least a second group of CCs that share an analog transmitter beamformer at the second node can be received by the first node from the second node. In an aspect, beam determining component 252, e.g., in conjunction with processor(s) 312, memory 316, transceiver 302, communicating component 242, etc., can receive, by the first node from the second node, the second indication of at least the second group of CCs that share an analog transmitter beamformer at the second node. For example, beam determining component 252 can receive this indication from the UE 104, as described above, where the first group of CCs and the second group of CCs can be the same or different, the first indication can be received in a same or different signal or communications as the second indication, etc.

In method 600, optionally at Block 606, antenna resources for receiving signals over each of the CCs in the first group of CCs can be beamformed, by the first node and based on the first indication, using the analog receiver beamformer. In an aspect, beamforming component 256, e.g., in conjunction with processor(s) 212, memory 216, transceiver 202, communicating component 242, etc., can beamform, by the first node and based on the first indication, antenna resources for receiving signals over each of the CCs in the first group of CCs using the analog receiver beamformer. In this example, communicating component 242 can receive downlink signals from the base station 102 over the CCs in the first group and based on the analog receiver beamformer.

In method 700, optionally at Block 706, antenna resources for transmitting signals over each of the CCs in the first group of CCs can be beamformed, by the first node and based on the first indication, using a corresponding analog transmitter beamformer. In an aspect, beamforming component 256, e.g., in conjunction with processor(s) 312, memory 316, transceiver 302, communicating component 242, etc., can beamform, by the first node and based on the first indication, antenna resources for transmitting signals over each of the CCs in the first group of CCs using the corresponding analog transmitter beamformer. For example, beam determining component 252 can determine the analog transmitter beamformer that corresponds to the analog receiver beamformer received in the indication at Block 702. In this example, communicating component 242 can transmit downlink signals to the UE 104 over the CCs in the first group and based on the analog transmitter beamformer.

In method 600, optionally at Block 608, antenna resources for transmitting signals over each of the CCs in the second group of CCs can be beamformed, by the first node and based on the second indication, using the analog transmitter beamformer. In an aspect, beamforming component 256, e.g., in conjunction with processor(s) 212, memory 216, transceiver 202, communicating component 242, etc., can beamform, by the first node and based on the second indication, antenna resources for transmitting signals over each of the CCs in the second group of CCs using the analog transmitter beamformer. In this example, communicating component 242 can transmit uplink signals to the base station 102 over the CCs in the second group and based on the analog transmitter beamformer.

In method 700, optionally at Block 708, antenna resources for receiving signals over each of the CCs in the second group of CCs can be beamformed, by the first node and based on the second indication, using a corresponding analog receiver beamformer. In an aspect, beamforming component 256, e.g., in conjunction with processor(s) 312, memory 316, transceiver 302, communicating component 242, etc., can beamform, by the first node and based on the second indication, antenna resources for receiving signals over each of the CCs in the second group of CCs using the corresponding analog receiver beamformer. For example, beam determining component 252 can determine the analog receiver beamformer that corresponds to the analog transmitter beamformer received in the indication at Block 704. In this example, communicating component 242 can receive uplink signals from the UE 104 over the CCs in the second group and based on the analog receiver beamformer.

In addition, in an example, in method 600 being performed by a UE (e.g., as the first node), optionally at Block 610, a configuration of a configured list of CCs can be received, by the first node, where the first group of CCs or the second group of CCs corresponds to the configured list of CCs. In an aspect, beam determining component 252, e.g., in conjunction with processor(s) 212, memory 216, transceiver 202, communicating component 242, etc., can receive, by the first node, the configuration of configured list of CCs, where the first group of CCs or the second group of CCs corresponds to the configured list of CCs, as described in Block 408 of method 400 in FIG. 4 above.

In receiving the configuration at Block 610, optionally at Block 612, the configuration of the configured list of CCs as uplink CCs having a same spatial relation can be received by the first node (e.g., by the UE 104 and from base station 102). In an aspect, beam determining component 252, e.g., in conjunction with processor(s) 212, memory 216, transceiver 202, communicating component 242, etc., can receive, by the first node (e.g., UE 104), the configuration of the configured list of CCs as uplink CCs having a same spatial relation, as described in Block 410 of method 400 in FIG. 4 above.

In receiving the configuration at Block 610, optionally at Block 614, the configuration of the configured list of CCs as downlink CCs having a same QCL assumption can be received by the first node (e.g., by the UE 104 and from base station 102). In an aspect, beam determining component 252, e.g., in conjunction with processor(s) 212, memory 216, transceiver 202, communicating component 242, etc., can receive, by the first node (e.g., UE 104), the configuration of the configured list of CCs as downlink CCs having a same QCL assumption, as described in Block 412 of method 400 in FIG. 4 above.

For example, the configured list of CCs and/or a corresponding spatial relation or QCL assumption can be received based on the first indication that the first group of CCs are to share the same analog receiver beamformer and/or the second indication that the second group of CCs are to share the same analog transmitter beamformer.

In addition, in an example, in method 600, optionally at Block 616, a configuration of a combination of CCs separate from a configured list of CCs having a same spatial relation or QCL assumption can be determined or received. In an aspect, beam determining component 252, e.g., in conjunction with processor(s) 212, memory 216, transceiver 202, communicating component 242, etc., can determine or receive (e.g., from the base station 102), the configuration of the combination of CCs separate from the configured list of CCs having a same spatial relation or QCL assumption, as described in Block 414 of method 400 in FIG. 4 above.

In addition, in an example, in method 700 being performed by a base station (e.g., as the first node), optionally at Block 710, a configuration of a configured list of CCs can be transmitted, by the first node, where the first group of CCs or the second group of CCs corresponds to the configured list of CCs. In an aspect, configuring component 342, e.g., in conjunction with processor(s) 312, memory 316, transceiver 302, etc., can transmit, by the first node, the configuration of the configured list of CCs, where the first group of CCs or the second group of CCs corresponds to the configured list of CCs, as described in Block 508 of method 500 in FIG. 5 above.

In transmitting the configuration at Block 710, optionally at Block 712, the configuration of the configured list of CCs as uplink CCs having a same spatial relation can be transmitted by the first node. In an aspect, configuring component 342, e.g., in conjunction with processor(s) 312, memory 316, transceiver 302, etc., can transmit, by the first node (e.g., base station 102), the configuration of the configured list of CCs as uplink CCs having a same spatial relation, as described in Block 510 of method 500 in FIG. 5 above.

In transmitting the configuration at Block 710, optionally at Block 714, the configuration of the configured list of CCs as downlink CCs having a same QCL assumption can be transmitted by the first node. In an aspect, configuring component 342, e.g., in conjunction with processor(s) 312, memory 316, transceiver 302, etc., can transmit, by the first node (e.g., base station 102), the configuration of the configured list of CCs as downlink CCs having a same QCL assumption, as described in Block 512 of method 500 in FIG. 5 above.

For example, the configured list of CCs and/or a corresponding spatial relation or QCL assumption can be determined and/or transmitted based on the first indication that the first group of CCs are to share the same analog receiver beamformer and/or the second indication that the second group of CCs are to share the same analog transmitter beamformer.

In addition, in an example, in method 700, optionally at Block 716, a configuration of a combination of CCs separate from a configured list of CCs having a same spatial relation or QCL assumption can be transmitted by the first node. In an aspect, configuring component 342, e.g., in conjunction with processor(s) 312, memory 316, transceiver 302, etc., can transmit, by the first node (e.g., base station 102), the configuration of the combination of CCs separate from the configured list of CCs having a same spatial relation or QCL assumption, as described in Block 514 of method 500 in FIG. 5 above.

Figure 8:
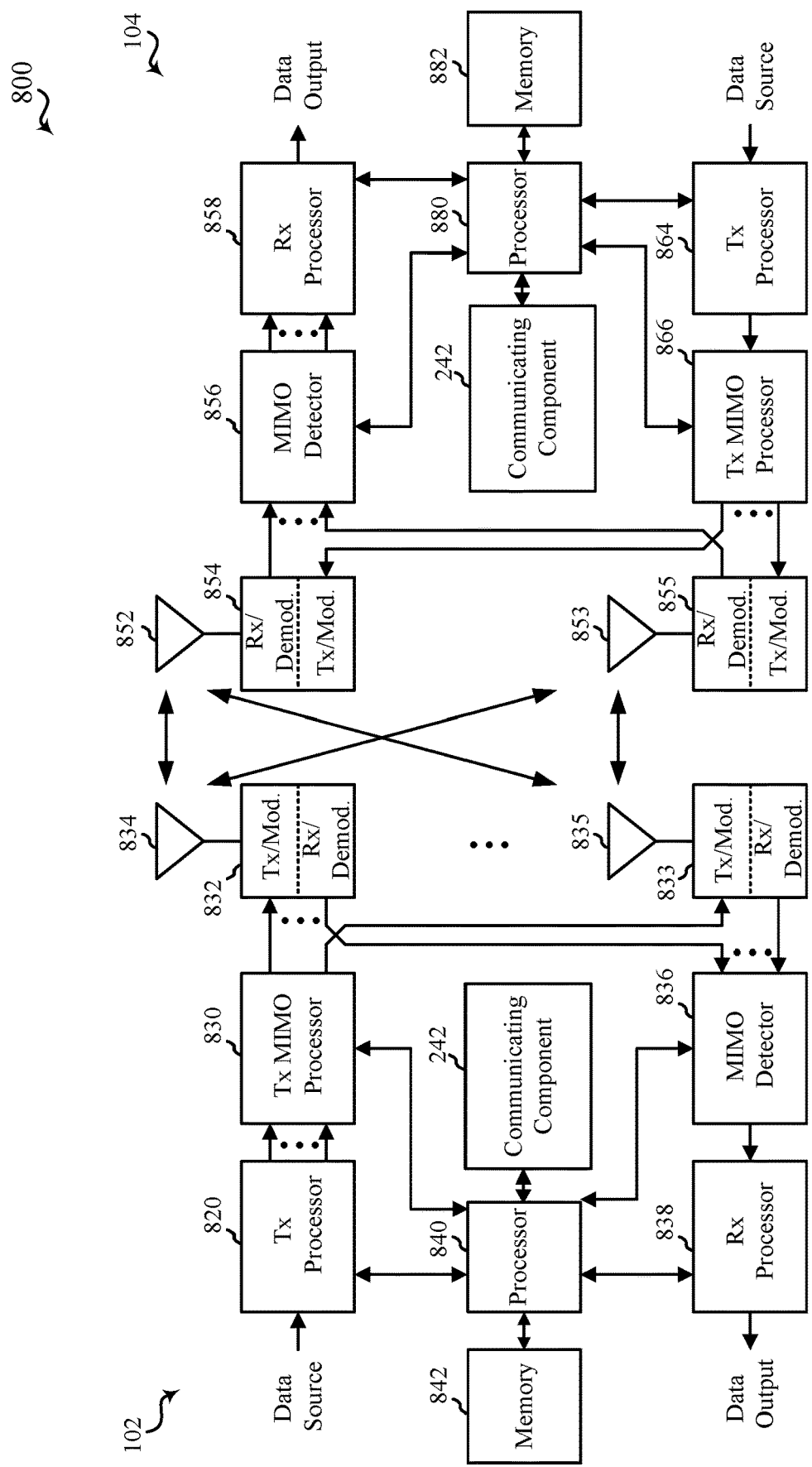
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a UE 104, in accordance with various aspects of the present disclosure. The MIMO communication system 800 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a communicating component 242 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a communicating component 242 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including transmitting, by a first node to a second node, a first indication of at least a first group of component carriers (CCs) that share an analog receiver beamformer at the first node, receiving, by the first node from the second node, a second indication of at least a second group of CCs that share an analog receiver beamformer at the second node, and beamforming, by the first node and based on the second indication, signals transmitted to the second node over each of the CCs in the second group of CCs using the same analog transmitter beamformer.

In Aspect 2, the method of Aspect 1 includes receiving, by the first node, a configuration of at least one configured list of CCs, wherein at least one of the first group of CCs or the second group of CCs corresponds to the at least one configured list of CCs.

In Aspect 3, the method of Aspect 2, includes wherein at least one of the first indication or the second indication includes an identifier associated with the at least one list of CCs.

In Aspect 4, the method of any of Aspects 2 to 3 include wherein the first node is a user equipment (UE), wherein receiving the configuration of the at least one configured list of CCs comprises receiving, from an access point, the configuration of the at least one configured list of CCs as uplink CCs having a same spatial relation.

In Aspect 5, the method of any of Aspects 2 to 4 include wherein the first node is a user equipment (UE), wherein receiving the configuration of the at least one configured list of CCs comprises receiving, from an access point, the configuration of the at least one configured list of CCs as downlink CCs having a same quasi-colocation (QCL) assumption.

In Aspect 6, the method of any of Aspects 1 to 5 include determining or receiving, by the first node, a configuration of a combination of CCs separate from a configured list of CCs having a same spatial relation or quasi-colocation (QCL) assumption.

In Aspect 7, the method of Aspect 6 includes receiving, from an access point, the configured list of CCs, wherein the combination of CCs includes a CC from the configured list of CCs and does not include another CC from the configured list of CCs.

In Aspect 8, the method of any of Aspects 6 or 7 include wherein at least two CCs in the combination of CCs are in different frequency bands.

In Aspect 9, the method of any of Aspect 6 to 8 include wherein the first group of CCs includes a portion of CCs in the at least one list of CCs, and wherein the first indication includes an identifier associated with the portion of CCs in the at least one list of CCs.

In Aspect 10, the method of any of Aspect 6 to 9 include wherein the second group of CCs includes a portion of CCs in the at least one list of CCs, and wherein the second indication includes an identifier associated with the portion of CCs in the at least one list of CCs.

In Aspect 11, the method of any of Aspect 1 to 10 include transmitting, by the first node, a configuration of at least one configured list of CCs, wherein at least one of the first group of CCs or the second group of CCs corresponds to the at least one configured list of CCs.

In Aspect 12, the method of Aspect 11 includes wherein at least one of the first indication or the second indication includes an identifier associated with the at least one list of CCs.

In Aspect 13, the method of any of Aspects 11 or 12 include wherein the first node is an access point, wherein transmitting the configuration of the at least one configured list of CCs comprises transmitting, to a user equipment (UE), the configuration of the at least one configured list of CCs as uplink CCs having a same spatial relation.

In Aspect 14, the method of Aspect 13 includes generating the at least one configured list of CCs based at least in part on the first group of CCs.

In Aspect 15, the method of any of Aspects 11 to 14 include wherein the first node is an access point, wherein transmitting the configuration of the at least one configured list of CCs comprises transmitting, to a user equipment (UE), the configuration of the at least one configured list of CCs as downlink CCs having a same quasi-colocation (QCL) assumption.

In Aspect 16, the method of Aspect 15 includes generating the at least one configured list of CCs based at least in part on the second group of CCs.

In Aspect 17, the method of any of Aspect 11 to 16 include transmitting, by the first node, a configuration of a combination of CCs separate from a configured list of CCs having a same spatial relation or quasi-colocation (QCL) assumption.

In Aspect 18, the method of Aspect 17 includes transmitting, to a user equipment (UE), the configured list of CCs, wherein the combination of CCs includes a CC from the configured list of CCs and does not include another CC from the configured list of CCs.

In Aspect 19, the method of any of Aspects 17 or 18 include wherein at least two CCs in the combination of CCs are in different frequency bands.

In Aspect 20, the method of any of Aspects 17 to 19 include wherein the first group of CCs includes a portion of CCs in the at least one list of CCs, and wherein the first indication includes an identifier associated with the portion of CCs in the at least one list of CCs.

In Aspect 21, the method of any of Aspects 17 to 20 include wherein the second group of CCs includes a portion of CCs in the at least one list of CCs, and wherein the second indication includes an identifier associated with the portion of CCs in the at least one list of CCs.

Aspect 22 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 21.

Aspect 23 is an apparatus for wireless communication including means for performing the operations of one or more methods in any of Aspects 1 to 21.

Aspect 24 is a computer-readable medium including code executable by one or more processors to perform the operations of one or more methods in any of Aspects 1 to 21.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
    a transceiver;
    a memory configured to store instructions; and
    one or more processors communicatively coupled with the transceiver and the memory, wherein the one or more processors are configured to:
        transmit, to a second node, a first indication that at least a group of component carriers (CCs) in different frequency bands share a beamformer at the apparatus;
        receive, from the second node, a configuration indicating the group of CCs to use for communicating with the second node, wherein the group of CCs includes a first CC in a first frequency band and a second CC in a second frequency band, wherein the first frequency band and the second frequency band are different frequency bands; and
        beamform, by the apparatus and based on the first indication, antenna resources for at least one of transmitting signals to, or receiving signals from, the second node over each of the CCs in the group of CCs using the beamformer.

2. The apparatus of claim 1, wherein the configuration indicates the CCs in the group of CCs as having a same quasi-colocation (QCL) assumption.

3. The apparatus of claim 1, wherein the one or more processors are configured to beamform the antenna resources at least in part by applying a same spatial relation for antenna resources for receiving the signals from the second node over each of the CCs in the group of CCs.

4. The apparatus of claim 1, wherein the one or more processors are configured to beamform the antenna resources at least in part by applying a same spatial relation for antenna resources for transmitting the signals to the second node over each of the CCs in the group of CCs.

5. The apparatus of claim 1, wherein the one or more processors are configured to beamform the antenna resources at least in part by controlling one or more parameters of multiple antennas at the apparatus to achieve a directional beam for transmitting the signals to, or receiving the signals from, the second node over each of the CCs in the group of CCs.

6. The apparatus of claim 1, wherein the group of CCs in the different frequency bands are configured in carrier aggregation for the apparatus.

7. The apparatus of claim 1, wherein the one or more processors are configured to receive the configuration based on transmitting the first indication.

8. The apparatus of claim 1, wherein the apparatus is a user equipment (UE) and the second node is a network node.

9. A method for wireless communication, comprising:
transmitting, by a first node to a second node, a first indication that at least a group of component carriers (CCs) in different frequency bands share a beamformer at the first node;
receiving, by the first node from the second node, a configuration indicating the group of CCs to use for communicating with the second node, wherein the group of CCs includes a first CC in a first frequency band and a second CC in a second frequency band, wherein the first frequency band and the second frequency band are different frequency bands; and
beamforming, by the first node and based on the first indication, antenna resources for at least one of transmitting signals to, or receiving signals from, the second node over each of the CCs in the group of CCs using the beamformer.

10. The method of claim 9, wherein the configuration indicates the CCs in the group of CCs as having a same quasi-colocation (QCL) assumption.

11. The method of claim 9, wherein beamforming the antenna resources includes applying a same spatial relation for antenna resources for receiving the signals from the second node over each of the CCs in the group of CCs.

12. The method of claim 9, wherein beamforming the antenna resources includes applying a same spatial relation for antenna resources for transmitting the signals to the second node over each of the CCs in the group of CCs.

13. The method of claim 9, wherein beamforming the antenna resources includes controlling one or more parameters of multiple antennas at the first node to achieve a directional beam for transmitting the signals to, or receiving the signals from, the second node over each of the CCs in the group of CCs.

14. The method of claim 9, wherein the group of CCs in the different frequency bands are configured in carrier aggregation for the first node.

15. The method of claim 9, wherein receiving the configuration is based on transmitting the first indication.

16. The method of claim 9, wherein the first node is a user equipment (UE) and the second node is a network node.

17. An apparatus for wireless communication, comprising:
a transceiver;
a memory configured to store instructions; and
one or more processors communicatively coupled with the transceiver and the memory, wherein the one or more processors are configured to:
receive, from a second node, a first indication that at least a group of component carriers (CCs) in different frequency bands share a beamformer at the apparatus;
transmit, to the second node, a configuration indicating the group of CCs to use for communicating with the second node, wherein the group of CCs includes a first CC in a first frequency band and a second CC in a second frequency band, wherein the first frequency band and the second frequency band are different frequency bands; and
beamform, by the apparatus and based on the first indication, antenna resources for at least one of transmitting signals to, or receiving signals from, the second node over each of the CCs in the group of CCs using the beamformer.

18. The apparatus of claim 17, wherein the configuration indicates the CCs in the group of CCs as having a same quasi-colocation (QCL) assumption.

19. The apparatus of claim 17, wherein the one or more processors are configured to beamform the antenna resources at least in part by applying a same spatial relation for antenna resources for transmitting the signals to the second node over each of the CCs in the group of CCs.

20. The apparatus of claim 17, wherein the one or more processors are configured to beamform the antenna resources at least in part by applying a same spatial relation for antenna resources for receiving the signals from the second node over each of the CCs in the group of CCs.

21. The apparatus of claim 17, wherein the one or more processors are configured to beamform the antenna resources at least in part by controlling one or more parameters of multiple antennas at the apparatus to achieve a directional beam for transmitting the signals to, or receiving the signals from, the second node over each of the CCs in the group of CCs.

22. The apparatus of claim 17, wherein the group of CCs in the different frequency bands are configured in carrier aggregation for the apparatus.

23. The apparatus of claim 17, wherein the one or more processors are configured to transmit the configuration based on receiving the first indication.

24. A method for wireless communication, comprising:
receiving, by a first node and from a second node, a first indication that at least a group of component carriers (CCs) in different frequency bands share a beamformer at the first node;
transmitting, by the first node and to the second node, a configuration indicating the group of CCs to use for communicating with the second node, wherein the group of CCs includes a first CC in a first frequency band and a second CC in a second frequency band, wherein the first frequency band and the second frequency band are different frequency bands; and
beamforming, by the first node and based on the first indication, antenna resources for at least one of transmitting signals to, or receiving signals from, the second node over each of the CCs in the group of CCs using the beamformer.

25. The method of claim 24, wherein the configuration indicates the CCs in the group of CCs as having a same quasi-colocation (QCL) assumption.

26. The method of claim 24, wherein beamforming the antenna resources includes applying a same spatial relation for antenna resources for transmitting the signals to the second node over each of the CCs in the group of CCs.

27. The method of claim 24, wherein beamforming the antenna resources includes applying a same spatial relation for antenna resources for receiving the signals from the second node over each of the CCs in the group of CCs.

28. The method of claim 24, wherein beamforming the antenna resources includes controlling one or more parameters of multiple antennas at the first node to achieve a directional beam for transmitting the signals to, or receiving the signals from, the second node over each of the CCs in the group of CCs.

29. The method of claim 24, wherein the group of CCs in the different frequency bands are configured in carrier aggregation for the first node.

30. The method of claim 24, wherein transmitting the configuration is based on receiving the first indication.

* * * * *